US012662649B2

(12) United States Patent
Zhou et al.

(10) Patent No.: US 12,662,649 B2
(45) Date of Patent: Jun. 23, 2026

(54) METHOD FOR PREPARING LOW ERUCIC ACID FRAGRANT RAPESEED OIL

(71) Applicant: Oil Crops Research Institute, CAAS, Wuhan (CN)

(72) Inventors: Qi Zhou, Wuhan (CN); Chang Zheng, Wuhan (CN); Chuyun Wan, Wuhan (CN); Fenghong Huang, Wuhan (CN); Wenlin Li, Wuhan (CN); Changsheng Liu, Wuhan (CN); Xiangning Tang, Wuhan (CN)

(73) Assignee: Oil Crops Research Institute, CAAS, Wuhan (CN)

( * ) Notice: Subject to any disclaimer, the term of this patent is extended or adjusted under 35 U.S.C. 154(b) by 671 days.

(21) Appl. No.: 18/185,871

(22) Filed: Mar. 17, 2023

(65) Prior Publication Data

US 2024/0182811 A1 Jun. 6, 2024

(30) Foreign Application Priority Data

Dec. 6, 2022 (CN) ......................... 202211552754.9

(51) Int. Cl.

| | |
|---|---|
| ***C11B 3/00*** | (2006.01) |
| ***A23D 9/02*** | (2006.01) |
| ***C11B 9/00*** | (2006.01) |

(52) U.S. Cl.

CPC ............ *C11B 3/001* (2013.01); *C11B 9/0003* (2013.01)

(58) Field of Classification Search

CPC .... A23D 9/02; C11B 1/04; C11B 3/06; C11B 3/04; C11B 3/006; C11B 3/16; C11B 3/001; C11B 9/03

USPC .................................................... 512/5, 4, 1

See application file for complete search history.

(56) References Cited

FOREIGN PATENT DOCUMENTS

CN 114196471 A * 3/2022 ............... C11B 1/04

OTHER PUBLICATIONS

Zhou et al, CN 114196471 Machine Translation, Dec. 10, 2021 (Year: 2021).*

* cited by examiner

*Primary Examiner* — Jessica Whiteley

(74) *Attorney, Agent, or Firm* — McDonnell Boehnen Hulbert & Berghoff LLP

(57) ABSTRACT

Disclosed is a method for preparing a low erucic acid fragrant rapeseed oil. The method includes subjecting a double low rapeseed to aroma-generating treatment, to obtain an aroma-generated rapeseed, the double low rapeseed including lower than 3 wt % of erucic acid, lower than 45 μmol/g of total glucosinolates, 6-15 μmol/g of 3-butenyl glucosinolate, and 0.4-2.0 μmol/g of 4-methylthiobutyl glucosinolate; mechanically squeezing the aroma-generated rapeseed, to obtain a crude oil; and degumming the crude oil, to obtain the low erucic acid fragrant rapeseed oil.

14 Claims, No Drawings

METHOD FOR PREPARING LOW ERUCIC ACID FRAGRANT RAPESEED OIL

CROSS REFERENCE TO RELATED APPLICATION

This patent application claims the benefit and priority of Chinese Patent Application No. 202211552754.9, entitled “Method for Preparing Low Erucic Acid Fragrant Rapeseed Oil” filed on Dec. 6, 2022, the disclosure of which is incorporated by reference herein in its entirety as part of the present disclosure.

TECHNICAL FIELD

The present disclosure relates to the field of grain and oil processing technology, in particular to a method for preparing a low erucic acid fragrant rapeseed oil.

BACKGROUND ART

Rapeseed oil is an important domestic vegetable oil. With the dual oriented pursuit of food flavor and health by the people, the demand for fragrant rapeseed oil with strong aroma is increasing. Fragrant rapeseed oil is generally produced by first aroma generation and then mechanical squeezing. Complex reactions such as Maillard reaction, amino acid degradation, lipid oxidation and glucosinolate degradation occur in the rapeseed during aroma generation, forming a rich aroma of rapeseed oil. At present, the raw materials for preparing fragrant rapeseed oil are mainly divided into two categories. The first category is the rapeseed with medium-level erucic acid and high-level glucosinolate, and the second category is the rapeseed with low-level erucic acid and low-level glucosinolate. The former contains a relatively high erucic acid content (15-25 wt %); nevertheless, the high erucic acid content in vegetable oil could easily cause thickening of blood vessel walls and deposition of myocardial fat, which is not conducive to human health, thereby not meeting the current standards for healthy, delicious, and high-quality edible oils. Through previous studies, it is also found that the erucic acid has a limited effect on the flavor of the rapeseed oil during processing, while the composition of glucosinolate is the core factor that affects the flavor of the fragrant rapeseed oil. The second category of rapeseed is double low rapeseed, with low erucic acid content that meets health needs. However, low total glucosinolates content may also lead to insufficient flavor of the rapeseed oil, glucosinolate being constituted of one molecule β-D-glucosinolates, sulfonic aldehyde oxime groups, and amino acid side chains. Typical examples in rapeseed are 3-butenyl glucosinolate, 4-hydroxy-3-indole methyl glucosinolate, 4-methylthiobutyl glucosinolate, phenylethyl glucosinolate, etc. However, there are various types of glucosinolates in rapeseed, and through rapeseed processing, glucosinolates with different structures are converted into different flavor substances. Since different flavor substances have different threshold and aroma activity values, there are significant differences in their impact on fragrant rapeseed oil. Not all glucosinolate substances in high-level glucosinolate rapeseed have a fragrant oil effect on rapeseed oil, and there are also substances that are very important for the flavor of rapeseed oil in low-level total glucosinolate rapeseed oil, and these key products would interact during the processing process, thereby affecting the flavor of vegetable oil. Therefore, how to prepare both healthy and delicious rapeseed oil and obtain high-quality fragrant rapeseed oil is of great significance for the people’s pursuit of healthy and delicious oil and the rapeseed oil processing industry.

SUMMARY

In view of the above, an object of the present disclosure is to provide a method for preparing a low erucic acid fragrant rapeseed oil. In the present disclosure, the double low rapeseed containing lower than 3 wt % of erucic acid, lower than 45 μmol/g of total glucosinolates, 6-15 μmol/g of 3-butenyl glucosinolate, and 0.4-2.0 μmol/g of 4-methylthiobutyl glucosinolate is used to prepare a fragrant rapeseed oil with rich flavor.

In order to achieve the above object of the present disclosure, the present disclosure provides the following technical solutions.

Provided is a method for preparing a low erucic acid fragrant rapeseed oil, including

- subjecting a double low rapeseed to aroma-generating treatment, to obtain an aroma-generated rapeseed; the double low rapeseed containing lower than 3 wt % of erucic acid, lower than 45 μmol/g of total glucosinolates, 6-15 μmol/g of 3-butenyl glucosinolate, and 0.4-2.0 μmol/g of 4-methylthiobutyl glucosinolate;
- mechanically squeezing the aroma-generated rapeseed, to obtain a crude oil; and
- degumming the crude oil, to obtain the low erucic acid fragrant rapeseed oil.

In some embodiments, the aroma-generating treatment includes pressure aroma-generating treatment, microwave aroma-generating treatment, or stir-frying aroma-generating treatment.

In some embodiments, the pressure aroma-generating treatment is performed at a temperature of 140-200° C. and a pressure of 0.7-1.0 MPa for 1-5 minutes.

In some embodiments, the microwave aroma-generating treatment is performed at a microwave power of 400-1200 W for 4-12 minutes.

In some embodiments, the stir-frying aroma-generating treatment is performed at a temperature of 140-200° ° C. for 20-40 minutes.

In some embodiments, the aroma-generated rapeseed has a water content of 3-5 wt %.

In some embodiments, mechanically squeezing the aroma-generated rapeseed is performed at a temperature of 130-160° C., with a processing capacity of 5 kg/(5-30) minutes, and mechanically squeezing the aroma-generated rapeseed is performed by using a mechanical squeezer at a current of 0.5-20 A.

In some embodiments, a degumming agent used for the degumming is silicon dioxide; and the degumming agent is in an amount of 0.2-2% of a mass of the low erucic acid fragrant rapeseed oil.

In some embodiments, the method further includes after the degumming, subjecting a degummed oil obtained from the degumming to natural sedimentation and solid-liquid separation, to obtain a liquid component of the low erucic acid fragrant rapeseed oil, where the natural sedimentation is performed at room temperature for 24-48 h.

The present disclosure provides a method for preparing a low erucic acid fragrant rapeseed oil. In the present disclosure, the inventive concept of producing a fragrant rapeseed oil oriented by rapeseed raw materials is first proposed, and the key flavor precursors, 3-butenyl glucosinolate and 4-methylthiobutyl glucosinolate particularly 4-methylthiobutyl glucosinolate are screened out from the double low rapeseed raw material, as important contributors to the flavor formation of rapeseed oil. Specifically, during the oil production, through Lossen rearrangement, 3-butenyl glucosinolate is converted into 3-butenyl isothiocyanate, and through the pyrolysis of 4-methylthiobutyl glucosinolate, 4-methylthio isothiocyanate, 4-methylthiovaleronitrile, 4-pentenenitrile and other important flavor substances are generated. This glucosinolate can further be converted into dimethyl disulfide and dimethyl trisulfide through redox, desulfurization and pyrolysis processes, which is conducive to the formation of characteristic flavor of the fragrant rapeseed oil. 4-methylthiovaleronitrile, 4-pentenenitrile, 3-butenyl isothiocyanate, dimethyl sulfide, dimethyl disulfide, and dimethyl trisulfide are the most important aroma sources of rapeseed, and a synergistic fragrance enhancing effect is achieved between each other of them, thereby providing a new standard for screening raw materials for the low erucic acid fragrant rapeseed oil. That is to say, the double low rapeseed containing lower than 3 wt % of erucic acid, lower than 45 μmol/g of total glucosinolates, and meanwhile 6-15 μmol/g of 3-butenyl glucosinolate, and 0.4-2.0 μmol/g of 4-methylthiobutyl glucosinolate is used as the raw material and subjected to aroma generating treatment, which could impart a rich flavor to the rapeseed oil to the maximum degree. After mechanical squeezing and degumming, a fragrant rapeseed oil with a rich and stable roasted flavor and spicy flavor is prepared. Further, the prepared fragrant rapeseed oil not only meets the health needs of low erucic acid and reasonable fatty acid composition, but also follows the market's pursuit of rich flavor. As shown in the example results, the total concentration of typical pyrazine compounds with roasted flavor in the fragrant rapeseed oil prepared in the present disclosure is in a range of 88.17-102.86 mg/kg, having a sensory score of 14.08-14.41; the total concentration of degradation products of glucosinolate and sulfur compounds with spicy flavor is in a range of 232.09-290.16 mg/kg. In the disclosure, the rapeseed oil prepared from the double low rapeseed (containing lower than 3 wt % of erucic acid, and less than 45 μmol/g of total glucosinolates) has nutritional functions such as reducing total cholesterol, preventing ischemic stroke, promoting brain development of infants and young children, preventing cognitive and brain dysfunction of the elderly, and treating nervous system disorders. Further, the contents of fine glucosinolate components are defined, and a fragrant rapeseed oil with a good flavor can be prepared.

The preparation method according to the present disclosure has simple operations, and low cost, and thus is suitable for industrial production.

DETAILED DESCRIPTION OF THE EMBODIMENTS

The present disclosure provides a method for preparing a low erucic acid fragrant rapeseed oil, including the following steps:

- subjecting a double low rapeseed to aroma-generating treatment, to obtain an aroma-generated rapeseed, the double low rapeseed containing lower than 3 wt % of erucic acid, lower than 45 μmol/g of total glucosinolates, 6-15 μmol/g of 3-butenyl glucosinolate, and 0.4-2.0 μmol/g of 4-methylthiobutyl glucosinolate;
- mechanically squeezing the aroma-generated rapeseed, to obtain a crude oil; and
- degumming the crude oil, to obtain the low erucic acid fragrant rapeseed oil.

In the present disclosure, unless otherwise specified, all raw material components are commercially available goods well-known to those skilled in the art.

In the present disclosure, the double low rapeseed is subjected to aroma-generating treatment, to obtain the aroma-generated rapeseed.

In the present disclosure, the content of 3-butenyl glucosinolate in the double low rapeseed is in a range of 6-15 μmol/g, preferably 7-14 μmol/g, more preferably 8-13 μmol/g, further more preferably 9-12 μmol/g, and most preferably 10-11 μmol/g. The content of erucic acid in the double low rapeseed is lower than 3 wt %, preferably 0.001-1 wt %, more preferably 0.001-0.5 wt %, and further more preferably 0.01-0.3 wt %. The content of glucosinolates in the double low rapeseed is lower than 45 μmol/g, preferably 0.1-42 μmol/g, more preferably 10-42 μmol/g, and further more preferably 20-42 μmol/g. The content of 4-methylthiobutyl glucosinolate in the double low rapeseed is in a range of 0.4-2.0 μmol/g, preferably 0.5-1.52 μmol/g, further more preferably 0.7-1.36 μmol/g, and most preferably 0.7-0.85 μmol/g. In some embodiments, the water content in the double low rapeseed is not larger than 8 wt %, preferably 6.0-7.2 wt %, and further more preferably 6.4-6.5 wt %.

In some embodiments of the present disclosure, the double low rapeseed is obtained by rapeseed screening, and the screening method preferably includes detecting the content of erucic acid, total glucosinolates, 3-butenyl glucosinolate, and 4-methylthiobutyl glucosinolate in the rapeseed, and screening out a rapeseed that meets requirements of an erucic acid content being lower than 3 wt %, and a total glucosinolates content being lower than 45 μmol/g, a 3-butenyl glucosinolate content being 6-15 μmol/g, and a 4-methylthiobutyl glucosinolate content being 0.4-2.0 μmol/g, which is considered as a qualified double low rapeseed. In some embodiments of the present disclosure, the detection process includes one or more of gas chromatography detection, near-infrared spectroscopy detection, liquid chromatography, and liquid chromatography-mass spectrometry. In some embodiments, the process for detecting erucic acid content is gas chromatography detection or infrared spectroscopy detection. In some embodiments, the process for detecting contents of glucosinolates, 3-butenyl glucosinolate, and 4-methylthiobutyl glucosinolate is liquid chromatography-mass spectrometry, as detailed in "Method for Extracting and Detecting Glucosinolate From Rapeseed-202010456857.X". In the present disclosure, there is no special limitations on the detection conditions of gas chromatography, near-infrared spectroscopy, liquid chromatography, and liquid chromatography-mass spectrometry, as long as the contents of erucic acid, glucosinolates, 3-butenyl glucosinolate, and 4-methylthiobutyl glucosinolate in the rapeseed could be detected, thereby obtaining the qualified double low rapeseed. In some embodiments of the present disclosure, solid impurities are first removed from the rapeseed, and the detection is then performed. In the present disclosure, there is no special limitations on the solid impurities, such as stone slag and/or mud blocks. In the present disclosure, by using the double low rapeseed containing 6-15 μmol/g of 3-butenyl glucosinolate and 0.4-2.0 μmol/g of 4-methylthiobutyl glucosinolate as raw material, it is ensured that the prepared fragrant rapeseed oil has stable and rich flavor. Also, the prepared fragrant rapeseed oil not only meets the health needs of low erucic acid, but also follows the market's pursuit of rich flavor.

In some embodiments of the present disclosure, the specific detection processes for rapeseed raw material are as follows:

1) Process for Detecting Erucic Acid Content in Rapeseed:

The process is performed by weighing and adding 60.0 mg (to the nearest 0.1 mg) of rapeseed into a 10 mL centrifuge tube, and adding 4 mL of isooctane thereto; after dissolution, adding 200 μL of a solution of potassium hydroxide in methanol (2 mol/L) thereto, oscillating the resulting mixture for 30 seconds, and then leaving to stand until clear; finally, adding about 1 g of sodium bisulfate thereto, and shaking the resulting final mixture vigorously, during which potassium hydroxide is neutralized; after the salt precipitates, transferring the upper solution to a sample bottle for testing. The gas chromatography conditions refer to the European standard EN14103 method, with a chromatographic column of HP INNOWAX (30 m×0.32 mm, 0.25 μm), a carrier gas of nitrogen, at a flow rate of 1.5 mL/min, a sample inlet temperature of 260° C., a split ratio of 80:1, with a heating program as follows: maintaining at 210° C. for 9 minutes, raising the temperature to 250° C. at a rate of 20° C./min, and maintaining at 250° C. for 10 minutes. The peak area normalization method is adopted as the quantitative analysis method, and the results are expressed as the mass fraction of each component.

2) Process for Detecting Glucosinolate Components (Including Glucosinolates, 3-butenyl Glucosinolate, and 4-methylthiobutyl Glucosinolate) in Rapeseed:

The process is performed by freezing and maintaining the rapeseed sample at −80° ° C. for 24-48 hours, to obtain a frozen rapeseed sample, then grinding and sieving the frozen rapeseed sample, to obtain a rapeseed powder sample; weighing 0.4 g of the rapeseed powder sample and placing into a 10 mL centrifuge tube, and adding 5 mL of 70% methanol aqueous solution thereto; heating the resulting mixture in a water bath at 75° C. for 40 minutes, and centrifuging at 8000 rmp for 20 minutes; collecting the supernatant, and making the volume be 5 mL, to obtain an extracting solution of rapeseed; mounting the C18 microcolumn device, rinsing the C18 microcolumn with 5 mL of methanol, draining, rinsing the C18 microcolumn with 5 mL of ultrapure water, draining, adding 1 mL of the extracting solution of rapeseed, draining, eluting with 4 mL of ultrapure water, and collecting the eluent; making the volume be 5 mL by adding ultrapure water to the eluent, and filtering the resulting mixture with 0.22 μm membrane, to obtain a solution passing through the 0.22 μm membrane, i.e., the test solution;

performing a detection on an injection test solution by using a liquid chromatography-mass spectrometer, wherein HPLC-MS is performed under the following analysis conditions: 5 mM solution of ammonium formate in a mixture of water and methanol (a volume ratio of 7:3) as the mobile phase, at a flow rate of 0.3 mL/min, and a chromatographic column of C18 column (inner diameter 100 mm)×2.5 mm, particle size of 1.7 μm, available from Waters), a sample injection volume of 10 μL, and the automatic sampler being at a constant temperature of 10° C.; and wherein the Q-Orbitrap mass spectrometer is equipped with a HESI source, which is operated with the following optimized parameter set: a sheath gas flow rate of 30 L/min; an auxiliary gas flow rate of 10 L/min; a purge gas flow rate of 1 L/min; a spray voltage of 4.30 kV; and a capillary temperature of 320° C.; and getting all quantitative data by using the above settings in LC-MS full scan mode, with a scanning range of 300-500 m/z, obtaining the m/z values determined in full scan mode and glucosinolate fragments observed in $MS^2$ mode.

In some embodiments of the present disclosure, the aroma generating treatment includes pressure aroma-generating treatment, microwave aroma-generating treatment, or stir-frying aroma-generating treatment. In some embodiments of the present disclosure, the pressure aroma-generating treatment is performed at a temperature of 140-200° C., preferably 145-155° C., and further preferably 150° C. In some embodiments, the pressure aroma-generating treatment is performed a pressure of 0.7-1.0 MPa and preferably 0.8-0.9 MPa. In some embodiments, the pressure aroma-generating treatment is performed for 1-5 minutes, and preferably 2-3 minutes. In some embodiments of the present disclosure, the microwave power for the microwave aroma-generating treatment is in a range of 400-1200 W, preferably 500-1000 W, and further preferably 600-800 W. In some embodiments, the microwave aroma-generating treatment is performed for 4-12 minutes, preferably 5-10 minutes, and further preferably 6-8 minutes. In some embodiments of the present disclosure, the stir-frying aroma-generating treatment is performed at a temperature of 140-200° C., preferably 145-155° C., and further preferably 150° C. In some embodiments, the stir-frying aroma-generating treatment is performed for 20-40 minutes, preferably 25-35 minutes, and further preferably 30 minutes. In the present disclosure, during the aroma-generating, the double low rapeseed undergoes Maillard reaction, lipid degradation and glucosinolate degradation, so that the flavor in the double low rapeseed is stimulated. The present disclosure is characterized by using a double low rapeseed which contains lower than 3 wt % of erucic acid, lower than 45 μmol/g of total glucosinolates, 6-15 μmol/g of 3-butenyl glucosinolate, and 0.4-2.0 μmol/g of 4-methylthiobutyl glucosinolate, as the raw material for preparation, and a fragrant rapeseed oil with a stable and rich flavor can be obtained through various aroma generating methods.

In some embodiments of the present disclosure, the aroma-generated rapeseed has a water content of 3-5 wt %, preferably 3-4.5 wt %, and further preferably 3-4 wt %. In some embodiments, when the water content of the rapeseed obtained from the aroma generating treatment does not meet the requirement of water content being 3-5 wt %, the method further includes adjusting the water content of the rapeseed obtained from the aroma generating treatment to 3-5 wt %. In the present disclosure, there is no special limitations on the process for water content adjustment, and any process for water content adjustment well known to those skilled in the art may be used, such as adding water or drying.

According to the present disclosure, after obtaining the aroma-generated rapeseed, the aroma-generated rapeseed is mechanically squeezed, to obtain a crude oil. In some embodiments of the present disclosure, the mechanically squeezing is performed at a temperature of 130-160° C., preferably 135-155° C., and further preferably 140-150° C. In some embodiments, the mechanically squeezing is performed with a processing capacity of 5 kg/(5-30) minutes, preferably 5 kg/(10-25) minutes, and further preferably 5 kg/(15-20) minutes. In some embodiments, the mechanically squeezing is performed by using a mechanical squeezer. In some embodiments, the mechanical squeezer is operated at a current of 0.5-20 A, preferably 5-15 A, and further preferably 10-12 A. In the present disclosure, there is no special limitation on the mechanical squeezer, as long as the oil component could be separated from the aroma-generated rapeseed, such as a 95 type squeezer or screw squeezer.

According to the present disclosure, after obtaining the crude oil, the crude oil is degummed, to obtain the low erucic acid fragrant rapeseed oil. In some embodiments of the present disclosure, a degumming agent used for the degumming treatment is silicon dioxide. In some embodiments, the amount of the degumming agent is 0.2-2%, preferably 0.5-1.5%, and further preferably 1% of the mass of the low erucic acid fragrant rapeseed oil.

According to the present disclosure, after the degumming, the method further includes subjecting a degummed oil obtained from the degumming to natural sedimentation and solid-liquid separation, to obtain a liquid component of low erucic acid fragrant rapeseed oil. In some embodiments of the present disclosure, the natural sedimentation is performed at room temperature. In some embodiments, the natural sedimentation is performed for 24-48 hours, and preferably 30-40 hours. In the present disclosure, there is no special limitation on the solid-liquid separation, and a solid-liquid separation process well-known to those skilled in the art may be used, such as filtration.

The following will provide a clear and complete description of technical solutions of the present disclosure in conjunction with examples of the present disclosure. Obviously, the described examples are only part of examples of the present disclosure, not all of them. Based on the examples in the present disclosure, all other examples obtained by ordinary technicians in the art without creative labor should fall within the scope of the present disclosure.

In the following examples and comparative examples, the method for detecting erucic acid content in rapeseed is gas chromatography. The detection methods for the total amount of glucosinolate, 3-butenyl glucosinolate, and 4-methylthiobutyl glucosinolate are shown in the above text.

Example 1

A double low rapeseed (containing 0.10 wt % of erucic acid, 34.54 μmol/g of total glucosinolates, 9.63 μmol/g of 3-butenyl glucosinolate, 0.7 μmol/g of 4-methylthiobutyl glucosinolate, and 7.2 wt % of water) was added to a pressure reactor and subjected to aroma-generating treatment at 1.0 MPa and 150° C., for overall operating time of 3 minutes. The pressure was then released and the reactor was cooled to room temperature, and the water content of the rapeseed was adjusted to 3 wt %, obtaining an aroma-generated rapeseed. The aroma-generated rapeseed was mechanically squeezed by using a screw squeezer, obtaining a crude oil. 1% silicon dioxide was added to the crude oil and the crude oil was then degummed, obtaining a degummed oil. The degummed oil was left for standing precipitation at room temperature for 48 hours, and then filtered, obtaining a liquid component, i.e., the low erucic acid fragrant rapeseed oil.

Example 2

A double low rapeseed (containing 0.19 wt % of erucic acid, 41.54 μmol/g of total glucosinolates, 14.85 μmol/g of 3-butenyl glucosinolate, 0.85 μmol/g of 4-methylthiobutyl glucosinolate, and 6.0 wt % of water) was stir-fried at 150° C. for 30 minutes. After the stir-frying, the water content of the rapeseed was 1.5 wt %, and then was adjusted to 3 wt % by adding water, obtaining an aroma-generated rapeseed. The aroma-generated rapeseed was mechanically squeezed by using a screw squeezer, obtaining a crude oil. 1% silicon dioxide was added to the crude oil and the crude oil was then degummed, obtaining a degummed oil. The degummed oil was left for standing precipitation at room temperature for 48 hours, and then filtered, obtaining a liquid component, i.e., the low erucic acid fragrant rapeseed oil.

Example 3

A double low rapeseed (containing 0.24 wt % of erucic acid 39.56 μmol/g of total glucosinolates, 11.85 μmol/g of 3-butenyl glucosinolate, 1.36 μmol/g of 4-methylthiobutyl glucosinolate, and 6.5 wt % of water) was stir-fried at 150° C. for 30 minutes. After stir-frying, the water content of the rapeseed was 1.5 wt %, and then was adjusted to 3 wt % by adding water, obtaining an aroma-generated rapeseed. The aroma-generated rapeseed was mechanically squeezed by using a screw squeezer, obtaining a crude oil. 1% silicon dioxide was added to the crude oil and the crude oil was then degummed, obtaining a degummed oil. The degummed oil was left for standing precipitation at room temperature for 48 hours, and then filtered, obtaining a liquid component, i.e., the low erucic acid fragrant rapeseed oil.

Example 4

A double low rapeseed (containing 0.19 wt % of erucic acid, 41.54 μmol/g of total glucosinolates, 14.85 μmol/g of 3-butenyl glucosinolate, 1.36 μmol/g of 4-methylthiobutyl glucosinolate, and 6.5 wt % of water) was subjected to microwave aroma-generating treatment at 600 W for 10 minutes. After the microwave aroma-generating treatment, the water content of the rapeseed was 1.9 wt %, and then adjusted to 3 wt % by adding water, obtaining an aroma-generated rapeseed. The aroma-generated rapeseed was mechanically squeezed by using a screw squeezer, obtaining a crude oil. 1% silicon dioxide was added to the crude oil and the crude oil was then degummed, obtaining a degummed oil. The degummed oil was left for standing precipitation at room temperature for 48 hours, and then filtered, obtaining a liquid component, i.e., the low erucic acid fragrant rapeseed oil.

Example 5

A double low rapeseed (containing 0.24 wt % of erucic acid, 39.56 μmol/g of total glucosinolates, 11.85 μmol/g of 3-butenyl glucosinolate, 1.52 μmol/g of 4-methylthiobutyl glucosinolate, and 6.4 wt % of water) was subjected to microwave aroma-generating treatment at 600 W for 10 minutes. After the microwave aroma-generating treatment, the water content of the rapeseed was 1.9 wt %, and then was adjusted to 3 wt % by adding water, obtaining an aroma-generated rapeseed. The aroma-generated rapeseed was mechanically squeezed by using a screw squeezer, obtaining a crude oil. 1% silicon dioxide was added to the crude oil and the crude oil was then degummed, obtaining a degummed oil. The degummed oil was left for standing precipitation at room temperature for 48 hours, and then filtered, obtaining a liquid component, i.e., the low erucic acid fragrant rapeseed oil.

Comparative Example 1

A fragrant rapeseed oil was prepared according to the procedures as described in Example 1, except that a double low rapeseed (containing 0.18 wt % of erucic acid, 55.72 μmol/g of total glucosinolates, 16.14 μmol/g of 3-butenyl glucosinolate, 0.30 μmol/g of 4-methylthiobutyl glucosinolate, and 6.5 wt % of water) was used as the raw material.

The prepared rapeseed oil contained 81.73 mg/kg of pyrazine compounds, 1.31 mg/kg of dimethyl trisulfide, 29.06 mg/kg of 4-pentenenitrile, 39.04 mg/kg of 2,4-pentadienenitrile and 9.35 mg/kg of 3-butenyl isothiocyanate (those functioning dominantly), resulting in weaker overall characteristic flavor.

Comparative Example 2

A fragrant rapeseed oil was prepared according to the procedures as described in Example 1, except that Sichuan native rapeseed (containing 15 wt % of erucic acid, 22.34 μmol/g of total glucosinolates, 2.14 μmol/g of 3-butenyl glucosinolate, 0.40 μmol/g of 4-methylthiobutyl glucosinolate, and 6.0 wt % of water) was used as the raw material.

The prepared rapeseed oil contained 83 mg/kg of pyrazine compounds, 39.78 mg/kg of 4-pentenenitrile, 48.57 mg/kg of 2,4-pentadienenitrile, and 28.05 mg/kg of 3-butenyl isothiocyanate (those functioning dominantly), resulting in weaker overall characteristic flavor.

Comparative Example 3

A fragrant rapeseed oil was prepared according to the procedures as described in Example 2, except that a double low rapeseed (containing 0.18% of erucic acid, 31.58 μmol/g of total glucosinolates, 5.8 μmol/g of 3-butenyl glucosinolate, 2.22 μmol/g of 4-methylthiobutyl glucosinolate, and 6.0 wt % of water) was used as the raw material.

The prepared rapeseed oil contained 83.83 mg/kg of pyrazine compounds, 48.98 mg/kg of 4-pentenenitrile (part of which were converted into 2,4-pentadienenitrile and 3-butenyl isothiocyanate), 60.63 mg/kg of 2,4-pentadienenitrile, and 12.53 mg/kg of 3-butenyl isothiocyanate (those functioning dominantly), resulting in weaker overall characteristic flavor.

Comparative Example 4

A fragrant rapeseed oil was prepared according to the procedures as described in Example 4, except that a double low rapeseed (containing 0.18 wt % of erucic acid, 40.58 μmol/g of total glucosinolates, 9.58 μmol/g of 3-butenyl glucosinolate, 2.1 μmol/g of 4-methylthiobutyl glucosinolate, and 6.0 wt % of water) was used as the raw material.

The prepared rapeseed oil contained 73.32 mg/kg of pyrazine compounds, 56.02 mg/kg of 4-pentenenitrile (part of which were converted into 2,4-pentadienenitrile and 3-butenyl isothiocyanate), 67.28 mg/kg of 2,4-pentadienenitrile, and 6.58 mg/kg of 3-butenyl isothiocyanate (those functioning dominantly), resulting in weaker overall characteristic flavor, the overall score of sensory evaluation being 12.09.

Sample Test:

1) The fragrant rapeseed oils prepared in Examples 1 to 5 and Comparative Examples 1 to 4 each were subjected to an aroma component analysis by headspace solid phase microextraction coupled with gas chromatography-mass spectrometry. The specific procedures were as follows: 5 g of the fragrant rapeseed oil was accurately weighed and placed into a 20 mL headspace bottle, and an internal standard substance (2-methyl-3-heptanone) was added thereto. The headspace bottle was sealed with a lid, and the sealed headspace bottle was then placed in a water bath at 40° C. and balanced for 20 minutes. The flavor component was extracted by using a 1 cm 50/30 μm DVB/CAR/PDMS type extraction head for 30 minutes, and the extraction head was then inserted into the sample inlet of the gas chromatography. The sample solution was analyzed at 250° C. for 5 minutes. The experimenter sniffed at the sniffing opening without break and recorded the time of smelling the odor. Three parallel experiments were conducted for each group. Gas chromatography-mass spectrometry was performed under the following conditions: DB-WAX chromatographic column (30 m×0.25 mm×0.25 μm), a carrier gas of helium, with a flow rate of 1.5 mL/min, and a sample inlet temperature of 250° C.; the initial temperature being 40° C., maintaining at the initial temperature for 2 minutes, then heating to 180° C. at a rate of 5° C./min, then maintaining at 180° C. for 2 minutes, and then heating to 240° C. at a rate of 8° C./min; the ion source temperature being 230° C., the electron energy being 70 eV, the transmission line temperature being 280° ° C., and the mass scanning range being 40-350 m/z. The analysis results of aroma components in the fragrant rapeseed oil are shown in Table 1.

TABLE 1

Contents of aroma components (mg/kg) in the fragrant rapeseed oils prepared in Examples 1 to 5 and Comparative Examples 1 to 4

| Aroma components | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Dimethyl disulfide | 1.62 ± 0.17 | 1.13 ± 0.78 | 1.19 ± 0.08 | 1.66 ± 0.13 | 1.87 ± 0.07 | 1.56 ± 0.39 | 1.45 ± 0.29 | 1.87 ± 0.07 | 1.78 ± 0.02 |
| Thiazole | 0.33 ± 0.03 | 0.57 ± 0.03 | 0.54 ± 0.02 | 0.25 ± 0.02 | 0.41 ± 0.06 | 0.46 ± 0.05 | 0.26 ± 0.07 | 0.41 ± 0.06 | 0.22 ± 0.03 |
| 2,4-Dimethylthiazole | 0.19 ± 0.03 | 0.33 ± 0.07 | 0.33 ± 0.03 | 0.24 ± 0.01 | 0.21 ± 0.02 | 0.25 ± 0.03 | 0.15 ± 0.04 | 0.21 ± 0.02 | 0.26 ± 0.01 |
| Dimethyltrisulfide | 0.98 ± 0.13 | 2.10 ± 0.38 | 1.91 ± 0.45 | 1.26 ± 0.11 | 0.90 ± 0.11 | 1.31 ± 0.13 | 1.05 ± 0.25 | 0.90 ± 0.11 | 0.68 ± 0.04 |
| Total amount of sulfur compounds | 3.13 ± 0.35 | 4.13 ± 1.21 | 3.97 ± 1.74 | 3.41 ± 0.26 | 3.39 ± 0.24 | 3.58 ± 0.55 | 2.91 ± 0.64 | 2.39 ± 0.24 | 2.94 ± 0.05 |
| 2-Butenenitrile | 8.31 ± 0.88 | 5.46 ± 1.78 | 4.37 ± 1.43 | 5.52 ± 0.90 | 4.34 ± 0.36 | 3.00 ± 0.36 | 4.52 ± 0.90 | 2.29 ± 0.14 | 2.99 ± 0.05 |
| 3-Butenenitrile | 6.09 ± 0.67 | 10.52 ± 3.09 | 8.78 ± 2.87 | 2.19 ± 0.01 | 1.98 ± 0.21 | 5.40 ± 0.51 | 2.74 ± 0.56 | 4.34 ± 0.36 | 1.83 ± 0.07 |
| 2,4-Pentadienenitrile | 45.27 ± 4.62- | 52.14 ± 1.63 | 53.37 ± 1.72 | 41.27 ± 4.62- | 50.27 ± 4.62- | 39.04 ± 0.99 | 48.57 ± 2.50 | 60.63 ± 0.89 | 67.28 ± 2.58 |
| 3-Pentenenitrile | 2.24 ± 0.23 | 5.60 ± 0.63 | 6.00 ± 0.54 | 1.68 ± 0.26 | 2.47 ± 0.54 | 6.15 ± 0.66 | 2.39 ± 0.81 | 4.75 ± 0.40 | 3.87 ± 0.58 |
| 5-Methylheptanitrile | 1.54 ± 0.01 | 4.03 ± 0.20 | 4.19 ± 0.34 | 2.51 ± 0.30 | 2.40 ± 0.24 | 3.62 ± 0.32 | 1.51 ± 0.30 | 2.40 ± 0.24 | 2.54 ± 0.01 |

TABLE 1-continued

Contents of aroma components (mg/kg) in the fragrant rapeseed oils prepared in Examples 1 to 5 and Comparative Examples 1 to 4

| Aroma components | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| 4-Pentenenitrile | 69.79 ± 4.63 | 60.56 ± 23.84 | 61.58 ± 2.38 | 76.37 ± 3.77 | 56.37 ± 3.77 | 29.06 ± 0.01 | 39.78 ± 14.03 | 48.98 ± 8.66 | 56.02 ± 0.51 |
| Heptanonitrile | 1.09 ± 0.17 | 4.57 ± 1.12 | 5.38 ± 1.50 | 0.70 ± 0.07 | 2.38 ± 1.50 | 3.37 ± 0.29 | 1.28 ± 0.29 | 2.43 ± 0.28 | 0.42 ± 0.06 |
| 5-Hexanenitrile | 45.82 ± 0.01 | 24.27 ± 13.15 | 44.14 ± 2.89 | 53.33 ± 1.85 | 43.33 ± 1.85 | 35.06 ± 0.01 | 56.74 ± 6.54 | 28.56 ± 12.22 | 30.38 ± 0.42 |
| 3-Butenyl isothiocyanate | 28.35 ± 0.99 | 33.40 ± 5.43 | 36.72 ± 6.16 | 24.49 ± 0.01 | 35.85 ± 0.08 | 9.35 ± 2.84 | 28.05 ± 3.39 | 12.53 ± 1.71 | 6.58 ± 0.01 |
| 4-(Methylthio)butanenitrile | 1.78 ± 0.38 | 7.25 ± 1.44 | 6.85 ± 2.59 | 7.42 ± 0.09 | 6.28 ± 0.08 | 2.93 ± 0.38 | 3.47 ± 1.17 | 2.54 ± 0.50 | 0.60 ± 0.08 |
| 5-(Methylthio)pentanenitrile | 17.51 ± 1.81 | 23.40 ± 0.01 | 23.51 ± 2.89 | 12.53 ± 1.71 | 10.85 ± 0.72 | 11.43 ± 7.85 | 12.48 ± 4.91 | 12.16 ± 7.37 | 1.45 ± 0.17 |
| Phenylacetonitrile | 10.67 ± 1.91 | 47.54 ± 7.84 | 51.58 ± 9.14 | 40.34 ± 2.91 | 45.82 ± 3.18 | 9.87 ± 7.31 | 12.12 ± 4.30 | 23.54 ± 5.05 | 4.63 ± 0.54 |
| 6-(Methylthio)hexanenitrile | 3.63 ± 0.92 | 4.98 ± 0.93 | 3.69 ± 0.28 | 2.54 ± 0.50 | 7.25 ± 1.44 | 3.02 ± 5.87 | 4.32 ± 1.87 | 4.79 ± 3.44 | 3.47 ± 1.17 |
| Total amount of isothiocyanates and nitriles | 242.09 ± 12.51 | 283.72 ± 47.96 | 310.16 ± 12.97 | 270.89 ± 9.67 | 269.59 ± 18.67 | 164.03 ± 30.98 | 207.91 ± 39.93 | 209.94 ± 33.38 | 182.03 ± 1.86 |
| Methylpyrazine | 25.05 ± 2.27 | 24.49 ± 2.28 | 23.26 ± 0.62 | 17.08 ± 1.59 | 13.54 ± 5.05 | 21.85 ± 2.19 | 24.91 ± 4.50 | 22.19 ± 1.95 | 25.52 ± 0.64 |
| 2,6-Dimethylpyrazine | 10.85 ± 1.44 | 11.84 ± 1.58 | 11.06 ± 0.86 | 7.11 ± 0.69 | 11.19 ± 1.27 | 10.56 ± 0.95 | 11.10 ± 2.42 | 11.19 ± 1.27 | 6.93 ± 0.42 |
| Ethylpyrazine | 3.52 ± 0.43 | 3.07 ± 0.51 | 2.82 ± 0.20 | 2.08 ± 0.18 | 2.85 ± 0.18 | 2.77 ± 0.22 | 3.39 ± 0.67 | 3.07 ± 0.35 | 2.32 ± 0.12 |
| 2-Ethyl-6-methylpyrazine | 7.60 ± 1.37 | 6.51 ± 1.36 | 5.82 ± 1.32 | 7.56 ± 0.42 | 7.15 ± 0.74 | 6.40 ± 0.61 | 4.72 ± 4.20 | 6.29 ± 0.95 | 6.80 ± 0.29 |
| 2-Ethyl-5-methylpyrazine | 6.04 ± 1.20 | 3.85± 0.17 | 3.92 ± 0.17 | 2.07 ± 0.24 | 3.47 ± 0.38 | 3.55 ± 0.32 | 5.32 ± 2.20 | 4.37 ± 0.78 | 2.59 ± 0.26 |
| 2,3,5-Trimethyl-pyrazine | 9.90 ± 1.93 | 10.12 ± 0.01 | 9.19 ± 0.93 | 8.01 ± 0.62 | 10.58 ± 1.32 | 8.33 ± 0.97 | 8.95 ± 2.76 | 8.93 ± 1.59 | 9.54 ± 0.43 |
| 2,6-Diethyl-pyrazine | 1.03 ± 0.20 | 0.29 ± 0.88 | 0.87 ± 0.58 | 0.87 ± 0.58 | 0.54 ± 0.05 | 0.56 ± 0.95 | 0.92 ± 0.29 | 0.71 ± 1.43 | 0.54 ± 0.05 |
| 3-Ethyl-2,5-dimethyl-pyrazine | 32.95 ± 4.63 | 30.49 ± 6.96 | 45.92 ± 4.93 | 40.93 ± 0.01 | 38.85 ± 0.21 | 27.71 ± 7.02 | 23.69 ± 7.90 | 27.08 ± 4.21 | 36.08 ± 1.68 |
| Total amount of pyrazines | 96.94 ± 13.3 | 90.66 ± 2.60 | 102.86 ± 5.89 | 85.71 ± 3.74 | 88.17 ± 9.2 | 81.73 ± 13.16 | 83.00 ± 24.54 | 83.83 ± 10.91 | 73.32 ± 3.82 |
| Furfural | 49.57 ± 5.12 | 76.40 ± 4.43 | 64.65 ± 0.73 | 60.25 ± 5.90 | 74.25 ± 3.69 | 70.25 ± 13.47 | 52.41 ± 9.67 | 82.9 ± 5.98 | 44.08 ± 2.12 |
| (E,E)-2,4-Heptadienal | 1.08 ± 0.58 | 2.71 ± 1.43 | 3.29 ± 0.88 | 0.71 ± 1.43 | 0.89 ± 0.24 | 1.35 ± 0.30 | 0.87 ± 0.26 | 1.30 ± 0.20 | 1.58 ± 0.78 |
| 5-Methylfurfural | 15.6 ± 2.93 | 32.40 ± 3.45 | 22.88 ± 4.35 | 27.24 ± 2.93 | 27.08 ± 4.21 | 35.45 ± 7.70 | 20.43 ± 5.71 | 44.4 ± 6.3 | 12.26 ± 0.95 |
| trans,trans-2,4-Decadienal | 0.58 ± 0.07 | 1.25 ± 0.01 | 0.87 ± 0.2 | 0.28 ± 0.07 | 1.28 ± 0.08 | 0.69 ± 0.17 | 0.26 ± 0.05 | 1.36 ± 0.57 | 0.12 ± 0.07 |
| 1-Methyl-2-pyrroline | 1.25 ± 0.01 | 1.28 ± 0.28 | 1.47 ± 0.14 | 1.25 ± 0.08 | 2.58 ± 0.07 | 3.03 ± 0.63 | 1.36 ± 0.57 | 2.60 ± 0.67 | 0.89 ± 0.10 |
| Total amount of aldehydes | 66.41 ± 8.04 | 211.51 ± 6.31 | 210.82 ± 4.49 | 87.49 ± 8.83 | 106.08 ± 8.29 | 190.76 ± 22.6 | 75.33 ± 16.22 | 131.60 ± 12.58 | 57.35 ± 3.12 |
| Acetic acid | 1.16 ± 0.18 | 2.80 ± 1.10 | 2.09 ± 0.94 | 1.86 ± 0.20 | 1.36 ± 0.57 | 0.59 ± 0.06 | 1.49 ± 0.38 | 0.54 ± 0.10 | 0.82 ± 0.07 |
| Propionic acid | 0.48 ± 0.09 | 3.31 ± 1.02 | 3.06 ± 1.05 | 0.58 ± 0.07 | 0.87 ± 0.14 | 1.12 ± 0.11 | 0.52 ± 0.12 | 0.87 ± 0.14 | 2.80 ± 0.05 |
| 4-Pentenoic acid | 4.28 ± 0.39 | 2.85 ± 0.47 | 4.44 ± 0.91 | 1.58 ± 0.14 | 3.29 ± 0.88 | 4.30 ± 0.69 | 1.21 ± 0.52 | 2.60 ± 0.67 | 3.80 ± 0.58 |
| Total amount of acids | 1.64 ± 0.27 | 6.11 ± 1.02 | 9.59 ± 1.06 | 2.44 ± 0.27 | 7.1 ± 0.78 | 6.01 ± 0.84 | 3.23 ± 1.02 | 1.42 ± 0.24 | 0.82 ± 0.07 |
| Furanmethanol | 17.07 ± 1.88 | 41.16 ± 5.10 | 38.15 ± 3.68 | 25.02 ± 2.52 | 17.87 ± 1.64 | 22.38 ± 4.42 | 18.87 ± 3.64 | 28.62 ± 2.38 | 18.11 ± 0.65 |
| 5-Methyl-2-furanmethanol | 1.37 ± 0.28 | 2.66 ± 0.13 | 2.47 ± 0.36 | 1.16 ± 0.18 | 0.58 ± 0.07 | 1.22 ± 0.21 | 1.44 ± 0.46 | 2.02 ± 0.35 | 0.58 ± 0.05 |
| Total amount of alcohols | 18.44 ± 2.16 | 43.82 ± 5.21 | 40.62 ± 4.04 | 26.18 ± 2.70 | 18.45 ± 1.71 | 33.60 ± 4.63 | 20.31 ± 4.10 | 30.64 ± 2.64 | 18.69 ± 0.65 |
| 2(5H)-Furanone | 6.25 ± 0.25 | 8.81 ± 0.74 | 8.23 ± 0.68 | 8.83 ± 0.36 | 6.81 ± 0.35 | 6.81 ± 0.58 | 7.73 ± 0.68 | 6.93 ± 0.47 | 9.45 ± 0.58 |
| Total amount of ketones | 6.25 ± 0.25 | 8.81 ± 0.74 | 8.23 ± 0.68 | 8.83 ± 0.36 | 6.81 ± 0.35 | 6.81 ± 0.58 | 7.73 ± 0.68 | 6.93 ± 0.47 | 9.45 ± 0.58 |

2) The overall flavor of the fragrant rapeseed oil was evaluated by sensory evaluation, in accordance with the methods recorded in GBT 10220-2012 "General Implementation of Sensory Analysis Methodology". Specifically, firstly, 10 evaluators (3 men and 7 women, aged 22-30 years) were selected to form an evaluation group, and discussed to determine the odor attributes of the fragrant rapeseed oil, including roasted flavor, pickled flavor, burnt flavor, green flavor, spicy flavor, and fishy flavor. The sensory characteristics of the fragrant rapeseed oil were evaluated by using a five-point scale (5: Very Strong, 4: Strong, 3: Medium, 2: Weak, 1: Very Weak, and 0: Not Detected). The sample of the fragrant rapid oil was randomly labeled with three digits and placed in a cup (with a capacity of 30 mL), with the temperature being maintained at 40±2° C. The evaluation group made intensity analysis of sensory attributes from the above six dimensions. The definitions of sensory attributes are shown in Table 2. The aroma attributes in six dimensions of roasted flavor, pickled flavor, burnt flavor, green flavor, spicy flavor, and fishy flavor of the fragrant rapeseed oil prepared in Examples 1 to 5 and Comparative Example 1 to 4 were evaluated, with a full score of 15 points. The score results of the sensory evaluations are shown in Table 3.

TABLE 2

Definitions of sensory attributes of the fragrant rapeseed oil

| Attributes | Definitions |
|---|---|
| Roasted flavor | Reminiscent of the taste of cooked nuts, such as the smell of roasted peanuts or roasted sesame seeds |
| Pickled flavor | Reminiscent of the taste of pickled vegetables, slightly salty, and the smell of lactic acid |
| Burnt flavor | Reminiscent of the smell of burnt grains or oil crops |
| Green flavor | Reminiscent of the smell of sprouting lettuce or beans |
| Spicy flavor | Reminiscent of the smell of pepper powder |
| Fishy flavor | Reminiscent of the fishy smell mixed with the smell of oil when frying fish |

TABLE 3

Score results of the sensory evaluations of the fragrant rapeseed oil

| Fragrant rapeseed oil | Roasted flavor | Pickled flavor | Burnt flavor | Green flavor | Spicy flavor | Fishy flavor | Total scores |
|---|---|---|---|---|---|---|---|
| Example 1 | 14.41 | 13.38 | 11.68 | 2.86 | 12.36 | 5.14 | 13.58 |
| Example 2 | 14.11 | 12.44 | 11.52 | 2.76 | 12.86 | 5.03 | 13.28 |
| Example 3 | 13.90 | 12.16 | 11.49 | 3.13 | 12.39 | 5.54 | 13.08 |
| Example 4 | 14.28 | 14.47 | 11.65 | 2.63 | 12.00 | 5.19 | 13.26 |
| Example 5 | 14.08 | 14.25 | 11.69 | 3.05 | 12.05 | 5.09 | 13.69 |
| Comparative Example 1 | 13.07 | 12.14 | 11.83 | 2.78 | 10.88 | 5.20 | 11.28 |
| Comparative Example 2 | 14.51 | 13.42 | 11.59 | 2.76 | 12.43 | 4.91 | 12.19 |
| Comparative Example 3 | 12.89 | 11.63 | 11.91 | 2.74 | 10.52 | 4.99 | 11.88 |
| Comparative Example 4 | 12.78 | 13.47 | 11.94 | 2.40 | 10.86 | 5.32 | 12.09 |

From Tables 1 and 3, it can be seen that: the total concentration of typical pyrazine compounds with roasted flavor is 85.71-102.86 mg/kg, and the score for roasted flavor is 14.08-14.41; the total concentration of isothiocyanate and nitrile compounds with spicy flavor is 232.09-290.16 mg/kg, and the sensory score for spicy flavor is 12.00-12.86, indicating that a fragrant rapeseed oil with strong and stable roasted flavor and spicy flavor could be always prepared by either traditional stir-frying or new hot processing methods when using a double low rapeseed containing lower than 3 wt % of erucic acid, lower than 45 μmol/g of the total glucosinolates, and meanwhile 6-15 μmol/g of 3-butenyl glucosinolate, and 0.4-2.0 μmol/g of 4-methylthiobutyl glucosinolate as raw material according to the present disclosure. Also, the prepared fragrant rapeseed oil not only meets the health needs of low erucic acid and reasonable fatty acid composition, but also follows the market's pursuit of rich flavor.

The above are only preferred embodiments of the disclosure. It should be pointed out that for ordinary technicians in the art, several improvements and embellishments can be made without departing from the principles of the disclosure, and these improvements and embellishments should also fall within the scope of the disclosure.

What is claimed is:

1. A method for preparing a low erucic acid fragrant rapeseed oil, comprising steps of subjecting a double low rapeseed to aroma-generating treatment, to obtain an aroma-generated rapeseed, wherein the double low rapeseed contains lower than 3 wt % of erucic acid, lower than 45 μmol/g of total glucosinolates, 6-15 μmol/g of 3-butenyl glucosinolate, and 0.4-2.0 μmol/g of 4-methylthiobutyl glucosinolate;

mechanically squeezing the aroma-generated rapeseed, to obtain a crude oil; and degumming the crude oil, to obtain the low erucic acid fragrant rapeseed oil.

2. The method as claimed in claim 1, wherein the aroma-generating treatment comprises pressure aroma-generating treatment, microwave aroma-generating treatment, or stir-frying aroma-generating treatment.

3. The method as claimed in claim 2, wherein the aroma-generating treatment is the pressure aroma-generating treatment, and the pressure aroma-generating treatment is performed at a temperature of 140-200° C. and a pressure of 0.7-1.0 MPa for 1-5 minutes.

4. The method as claimed in claim 2, wherein the aroma-generating treatment is the microwave aroma-generating treatment, and the microwave aroma-generating treatment is performed at a microwave power of 400-1200 W for 4-12 minutes.

5. The method as claimed in claim 2, wherein the aroma-generating treatment is the stir-frying aroma-generating treatment, and the stir-frying aroma-generating treatment is performed at a temperature of 140-200° C. for 20-40 minutes.

6. The method as claimed in claim 1, wherein the aroma-generated rapeseed has a water content of 3-5 wt %.

7. The method as claimed in claim 1, wherein mechanically squeezing the aroma-generated rapeseed is performed at a temperature of 130-160° C., with a processing capacity of 5 kg/(5-30) minutes, and mechanically squeezing the aroma-generated rapeseed is performed by using a mechanical squeezer at a current of 0.5-20 A.

8. The method as claimed in claim 1, wherein a degumming agent used for the degumming is silicon dioxide; and the degumming agent is in an amount of 0.2-2% of a mass of the low erucic acid fragrant rapeseed oil.

9. The method as claimed in claim 1, further comprising after the degumming, subjecting a degummed oil obtained from the degumming to natural sedimentation and solid-liquid separation, to obtain a liquid component of the low erucic acid fragrant rapeseed oil, wherein the natural sedimentation is performed at room temperature for 24-48 hours.

10. The method as claimed in claim 8, further comprising after the degumming, subjecting a degummed oil obtained from the degumming to natural sedimentation and solid-liquid separation, to obtain a liquid component of the low erucic acid fragrant rapeseed oil, wherein the natural sedimentation is performed at room temperature for.

11. The method as claimed in claim 2, wherein the aroma-generated rapeseed has a water content of 3-5 wt %.

12. The method as claimed in claim 3, wherein the aroma-generated rapeseed has a water content of 3-5 wt %.

13. The method as claimed in claim 4, wherein the aroma-generated rapeseed has a water content of 3-5 wt %.

14. The method as claimed in claim 5, wherein the aroma-generated rapeseed has a water content of 3-5 wt %.

* * * * *